Figure 1:
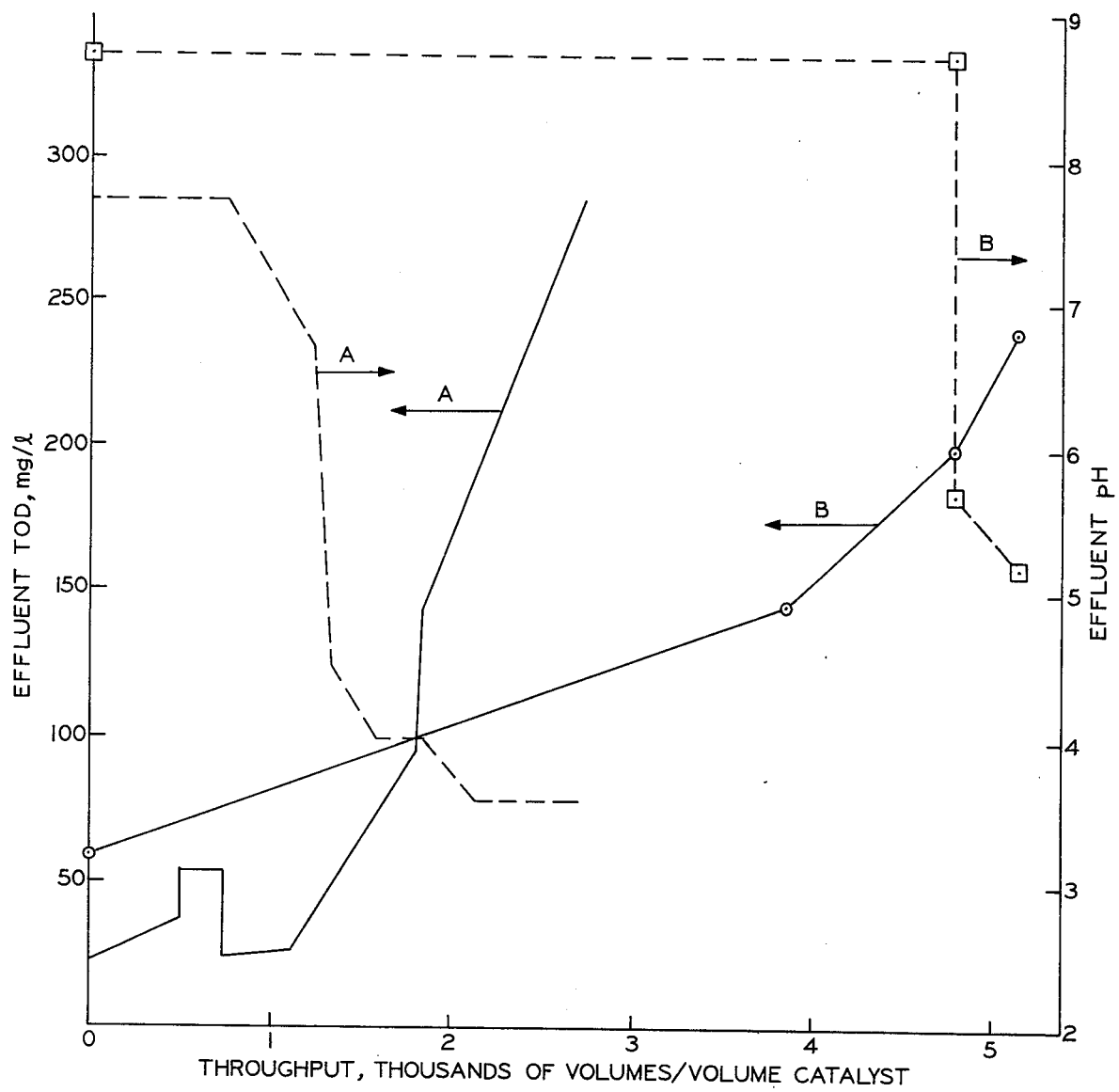

United States Patent [19]

McCarthy et al.

[11] 4,115,264
[45] Sep. 19, 1978

[54] METHOD OF PURIFYING POLLUTED WATER

[75] Inventors: William C. McCarthy; Robert O. Dunn, both of Bartlesville, Okla.

[73] Assignee: Phillips Petroleum Company, Bartlesville, Okla.

[21] Appl. No.: 711,033

[22] Filed: Aug. 2, 1976

Related U.S. Application Data

[63] Continuation of Ser. No. 572,044, Apr. 28, 1975, abandoned.

[51] Int. Cl.$^2$ .............................................. C02B 1/34
[52] U.S. Cl. ............................................... 210/63 R
[58] Field of Search ......................... 210/50, 59, 63 R

[56] References Cited

U.S. PATENT DOCUMENTS

| | | | |
|---|---|---|---|
| 2,029,958 | 2/1936 | Urbain | 210/2 |
| 2,690,425 | 9/1954 | Moses et al. | 210/2 |
| 3,054,653 | 9/1962 | Barton et al. | 23/2 |
| 3,557,238 | 1/1971 | Cunningham | 260/680 |
| 3,646,239 | 2/1972 | Hutson et al. | 260/680 |
| 3,823,088 | 7/1974 | Box et al. | 210/63 R |
| 3,912,626 | 10/1975 | Ely et al. | 210/63 R |

FOREIGN PATENT DOCUMENTS 47-44956  11/1972  Japan ................................... 210/63 R

*Primary Examiner*—Thomas G. Wyse

[57] ABSTRACT

In the liquid phase catalytic oxidation of organically polluted water containing negligible amounts of alkali metal by contacting the polluted water with an oxygen-containing gas and a catalyst effective to promote such liquid phase oxidation, the method of increasing the catalyst life comprising increasing the alkali metal concentration in the organically polluted water prior to the catalytic oxidation.

22 Claims, 1 Drawing Figure

LEGEND
A — TOD FOR RUN 1 OF TABLE I
A — pH FOR RUN 1 OF TABLE I
B — TOD FOR RUN 3 OF TABLE I
B — pH FOR RUN 3 OF TABLE I

METHOD OF PURIFYING POLLUTED WATER

This application is a continuation application of application Ser. No. 572,044, filed Apr. 28, 1975, entitled "Method of Purifying Polluted Water", now abandoned.

This invention relates to a method for the purification of organically polluted water by catalytic oxidation. In another aspect, this invention relates to a method of increasing the catalyst life in a process for the catalytic oxidation of organically polluted waters.

The problem of disposing of waste-containing waters has, in recent years, become more acute due to increasing population and increasing industrial activity. This particularly is true of waters which are polluted by the presence of organic materials such as waters discharged in a chemical process. Frequently, such waste waters contain organic materials in concentrations far too low for them to be conveniently or economically recoverable, yet in concentrations so high that it is impractical or undesirable to simply pump the waste water into available streams, rivers, lakes, or ponds.

The use of liquid phase catalytic oxidation of the organic materials in aqueous streams is well-known. These processes involve the contacting of the organically polluted water with an oxygen-containing gas and a catalyst effective for promoting the oxidation of the organic materials in the water. U.S. Pat. No. 2,029,958, issued to Urbain describes some of the catalysts which are effective in such purification processes. That patent teaches that the organic materials contained in the water can be oxidized in the presence of an oxygen-containing gas when there is present as a catalyst the salt or hydroxide of metals which can be increased in oxidation state. The typical metals listed include chromium, manganese, osmium, tin, vanadium, antimony, bismuth, molybdenum, and selenium. The disclosure of this patent is incorporated herein by reference.

U.S. Pat. No. 2,690,425 issued to Moses et al. sets forth still additional catalysts which are known to be effective for the liquid phase catalytic oxidation of organically polluted waters. The catalysts therein disclosed are the oxides of copper, nickel, cobalt, chromium, manganese, platinum, palladium, iron, cerium, silver, or mixtures thereof. The disclosure of the Moses patent is also incorporated herein by reference.

U.S. Pat. No. 3,823,088 issued to Box et al. indicates that for the catalytic oxidation of the organically polluted aqueous effluent from a hydrocarbon oxidative dehydrogenation process that a particularly effective catalyst is zinc aluminate promoted with at least one metal active for initiating oxidative reactions in the aqueous phase. The disclosure of the Box patent is herein incorporated by reference.

In the oxidative dehydrogenation process described in the Box patent, an oxygen-containing gas is fed to a catalytic reaction zone containing a catalyst such as stannic phosphate along with a butene feed and steam, and a substantial portion of the hydrogen produced by dehydrogenation is combusted to water vapor. This additional steam produced is recovered from the process effluent as condensate. Also, moderate concentrations of oxygenated hydrocarbons are generated which similarly appear in the condensed steam and/or in the hydrocarbon effluent. The presence of the oxygenated hydrocarbons in the condensed steam makes disposing of the condensed steam in available streams, etc., undesirable. Thus, according to the Box patent the organic material in the aqueous effluent from the oxidative dehydrogenation process is ordinarily present in amounts less than about 10 weight percent. Or stated differently, the carbon content of the aqueous effluent is generally in the range of about 10 to about 100,000 ppm carbon. The patent shows that for aqueous streams containing such small amounts of oxidized hydrocarbons that the zinc aluminate supported catalysts were particularly effective.

In observing the performance of zinc aluminate supported catalysts in the catalytic oxidation of the organic contaminants in the effluent from an oxidative dehydrogenation process, certain interesting discoveries have been made. Such waste water was found to typically have a pH of less than about 4, that is in the range of between about 2 and about 4, and a total oxygen demand (hereinafter referred to as TOD) of about 2200 mg/liter. After treating such contaminated effluent over a bed of fresh catalysts, the purified effluent generally was found to have a TOD of less than 20 and a pH of about 7. As more water is treated with the catalyst, the TOD of the treated water gradually increases and the pH slowly decreases. At some point the pH suddenly starts to drop much more rapidly. This so-called pH breakthrough usually occurs when the effluent TOD exceeds about 50. After this point has been reached, the effluent TOD starts to increase rapidly and soon is greater than 200 which in many areas is an unacceptable level for surface discharge. It has also been observed that when the pH breakthrough occurs, the catalyst bed is approximately 75 percent expended. Since the catalyst comprises a significant part of the expense involved in such purification processes, means of extending the catalyst life are of significant interest.

It has been surprisingly discovered that the addition of a minor amount of alkali metal ion delays the pH breakthrough and extends the useful life of the catalysts.

Therefore, an object of this invention is to provide an improved process for the catalytic oxidative purification of organically polluted waters.

Another object of this invention is to provide a method for increasing the catalyst life in processes for the liquid phase catalytic oxidation of organically polluted waters.

A still further object of this invention is to improve the liquid phase catalytic oxidation process disclosed in the Box et al. patent.

According to this invention, the life of a catalyst employed in the catalytic oxidation of organically polluted waters containing negligible amounts of alkali metal is extended by increasing the alkali metal concentration in the organically polluted water prior to subjecting the water to the catalytic oxidation.

This invention is generally applicable to any aqueous phase catalytic oxidation of organically polluted waters containing negligible amounts of alkali metal. The catalyst and process conditions employed are those known in the art.

As is known in the art, the temperatures generally employed in such processes are in the range of about 122° F. (50° C.) to about 662° F. (350° C.). Of course the optimum temperatures of oxidation are determined with reference to the particular organic compound decomposed and the degree of activity of the catalyst used. Also, the pressures will be determined by the temperature required and the composition of the waste material being oxidized.

When using a zinc aluminate catalyst, such as that disclosed in the Box patent, the type of metal active for initiating oxidative reactions which is employed therewith can be found in Groups IIIB, IVB, VB, VIB, VIIB, VIII, IB, and VA of the Periodic Table. For example, active and durable catalysts are obtained by promoting zinc aluminate with minor amounts of metals such as copper, manganese, nickel, cobalt, platinum, palladium, rhenium, iridium, rare earths such as lanthanum and cerium and combinations of these metals.

Particularly effective zinc aluminate catalyst compositions include Cu-zinc aluminate, Ni-zinc aluminate, Cu-Ni-zinc aluminate, Cu-Mn-zinc aluminate, Bi-zinc aluminate, Ce-zinc aluminate, Pt-zinc aluminate, Pd-zinc aluminate, Cu-Pt-zinc aluminate, Ir-zinc aluminate, Re-zinc aluminate, and La-Cu-Mn-zinc aluminate.

The concentration of the promoter metal on the zinc aluminate, after calcination, will generally be in the range of 0.05–20 wt. percent, preferably 0.1–10 wt. percent calculated as the metal and based upon the weight of the zinc aluminate support material.

According to this invention the alkali metal ion concentration is increased by adding small amounts of an alkali metal hydroxide or an alkali metal salt of a weak acid. For example, sodium carbonate, sodium bicarbonate, sodium borate, sodium acetate, sodium oxalate, potassium carbonate, potassium bicarbonate, potassium borate, potassium acetate or potassium oxalate may be employed. Generally the alkali metal ion concentration is adjusted so that the polluted water will contain about 10 to about 300 ppm of alkali metal. As will be shown in the Examples which will follow the range of about 20 to about 70 ppm is particularly beneficial. The most preferable range of alkali metal concentration when dealing with aqueous effluent from an oxydehydrogenation process is from about 30 to about 35 ppm of alkali metal ion.

While it is believed that any increase in the alkali metal ion concentration will increase the life of the catalyst, it has also been observed that as the alkali metal ion concentration is increased the TOD tends to increase. Thus, it is preferable that the amount of alkali metal ion added be less than that which would cause the treated water to have an unacceptable TOD prior to the pH breakthrough. Generally any alkali metal hydroxide or alkali metal salt of a weak acid can be employed. Sodium hydroxide and sodium carbonate are especially preferred.

The effectiveness of increasing the alkali metal concentration of organically polluted waters containing negligible alkali metal concentration will be demonstrated by the following examples.

EXAMPLE I

Employing 1/16 inch zinc aluminate extrudate, liquid phase oxidation catalysts were prepared according to the process disclosed in the above-mentioned Box patent. The finished catalyst was a zinc aluminate promoted with 4 wt. percent copper, 2 wt. percent manganese, and 1 wt. percent lanthanum, based upon the weight of the zinc aluminate. Runs were conducted employing this catalyst to purify the organically polluted effluent from a butene oxydehydrogenation process. Run A was made employing the typical butene oxydehydrogenation aqueous effluent. Run B employed the same effluent which had 35 ppm sodium added as sodium hydroxide prior to subjecting the effluent to the oxidation catalyst. The catalyst bed was 1.61 inch inside diameter and about 34 inches tall and was operated at about 480° F. (249° C.), 1050 psig and a liquid hourly space velocity of about 5.6 using about 100 percent excess oxygen fed concurrently with the water in both runs. The average TOD of the aqueous butene oxydehydrogenation effluent was about 2200 mg/liter.

A comparison of the two runs is shown in FIG. 1. FIG. 1 is a graph which shows the effect that alkali metal has on the catalytic oxidation of organically polluted water. In FIG. 1, the solid lines plot the TOD of the effluent from the liquid phase zinc aluminate catalysts employed. The dotted lines indicate the change in pH that occurred.

The FIGURE shows that when no sodium ions were added to the organically polluted water, at a throughput of about 2,200 volumes of water per volume of catalyst, the effluent TOD rose above 200 mg/liter a level which is generally considered to be the maximum acceptable level of carbon residues. It is also to be noted that at only about 1,250 volumes of water per volume of catalyst the pH breakthrough occurred. Shortly thereafter, it will be observed that the TOD of the treated water rose rapidly to an unacceptable level.

In Run B, in which the polluted water had been treated with enough sodium hydroxide to give a sodium concentration of 35 ppm, the pH of the treated water remained quite high until the throughput reached approximately 4,800 volumes/volume of catalyst. It will also be noted that the presence of the sodium ions also tended to cause the treated water to have a TOD during the early part of the catalysts life cycle that was higher than that obtained when no sodium was present.

EXAMPLE II

Using catalysts and process conditions identical to those set forth in Example I, a series of runs were conducted to determine the effect of various levels of alkali metal concentration on the catalytic oxidation process. The aqueous effluent from the butene oxydehydrogenation process initially contained no more than about 1 part per million of sodium. The effect of the sodium level on the liquid phase catalytic oxidation of the organic pollutants is shown in Table I.

TABLE I

| Run | 1 | 2 | 3 | 4 |
| --- | --- | --- | --- | --- |
| $Na^+$, ppm | 1 | 20–25 | 35 | 75 |
| TOD of Product Initially | 22 | 35 | 53 | 120–130 |
| TOD at pH Breakthrough | 48 | 130–160 | 200 | 300 |
| 200 TOD Throughput[a] | 3050 | [b] | 4750 | 5050 |

[a] Approximate throughput at which TOD reached 200.
[b] Not determined.

Table I clearly shows that the addition of sodium ions to organically polluted water containing negligible amounts of alkali metal ions does extend the catalyst life. The data also show, however, that as the alkali metal concentration is increased the TOD of the treated water tends to also increase. Thus, it should be apparent that if a particular TOD is preferred, there will be maximum alkali metal ion concentrations that can be employed practically. That is because the TOD increases as the catalyst is used and it increases with an increase in alkali metal concentration.

It will, of course, be obvious to one skilled in the art having possession of this disclosure that one could vary the alkali metal ion concentration continuously as the catalyst was employed so that as the TOD approached an undesirable level the alkali metal concentration could be reduced.

The foregoing examples are set forth merely to demonstrate that in the liquid phase catalytic oxidation of organically polluted waters containing negligible amounts of alkali metal ions by contacting such polluted water with an oxygen-containing gas and a catalyst effective to promote such liquid phase oxidation the catalyst life can be increased by adding sufficient amounts of alkali metal ions to the organically polluted water prior to the catalytic oxidation.

We claim:

1. In the liquid phase catalytic oxidation of organically polluted water, containing no more than about 1 part of alkali metal ions per million parts of polluted water, to reduce the total oxygen demand of said polluted water by contacting said polluted water with an oxygen-containing gas and a catalyst effective to promote such liquid phase oxidation comprising zinc aluminate promoted with at least one metal active for initiating oxidative reactions, the method of increasing the catalyst life comprising adding a sufficient amount of alkali metal ion to the organically polluted water prior to the catalytic oxidation to increase the throughput that can occur before the pH breakthrough occurs.

2. The method according to claim 1 wherein the amount of alkali metal ion employed is continuously reduced as the TOD of the treated water approaches a chosen maximum.

3. The method according to claim 1 wherein the alkali metal ion is added in the form of an alkali metal hydroxide or an alkali metal salt of weak acid.

4. The method according to claim 3 wherein the alkali metal is sodium.

5. The method according to claim 4 wherein the alkali metal concentration of the polluted water to be oxidized is adjusted to be within the range of about 10 to about 300 parts per million parts of the polluted water.

6. The method according to claim 4 wherein the alkali metal concentration is in the range of about 30 to about 35 parts per million parts of the polluted water.

7. The method according to claim 6 wherein the pH of the polluted water prior to the addition of the alkali metal ion is less than about 4.

8. The method according to claim 7 wherein the TOD of the unpurified polluted water is about 2200 mg/liter or less.

9. The method according to claim 4 wherein the alkali metal ion concentration of the polluted stream is such that the TOD prior to the pH breakthrough is no greater than the maximum allowable value.

10. The method according to claim 1 wherein the promoting metal is copper, manganese, nickel, cobalt, bismuth, platinum, palladium, rhenium, iridium, lanthanum, cerium, or combinations of those metals.

11. The method according to claim 1 wherein the catalyst is zinc aluminate promoted with copper, manganese, and lanthanum.

12. A method according to claim 11 wherein the concentration of promoter metals on the zinc aluminate is in the range of 0.05 to 20 weight percent based on the weight of the zinc aluminate, the temperature of the oxidation is in the range of about 50° C. to about 350° C., the molar ratio of polluted water to oxygen is in the range of 10:1 to 200:1, and the alkali metal concentration of the polluted water is adjusted to be within the range of about 10 to about 300 parts per million parts of the polluted water.

13. The method according to claim 12 wherein the organically polluted water is the waste aqueous effluent from a hydrocarbon oxidative dehydrogenation process and said organically polluted water prior to the addition of any alkali metal ion is about 4 pH or less and the TOD of the unpurified polluted water is about 2200 mg/liter or less.

14. In a process for the purification of an aqueous stream, containing dissolved and/or suspended oxidizable organic impurities and no more than about 1 part of alkali metal per million parts of the aqueous stream, to reduce the total oxygen demand of said aqueous stream by contacting said aqueous stream containing oxidizable organic impurities and an oxygen-containing gas with a catalyst consisting essentially of zinc aluminate promoted with 0.05 to 20 weight percent of (1) at least two different metals active for initiating oxidative reactions selected from the group consisting of the metals of the Groups IIIB, IVB, VB, VIB, VIIB, VIII, IB, and VA of the Periodic Table and (2) a rare earth metal under liquid phase oxidation conditions including a temperature in the range of 350° to 550° F. and a molar ratio of water to oxygen in the range of 10:1 to 200:1 to convert said organic impurities to innocuous materials so that said aqueous stream which has been substantially freed of said organic impurities can be safely discarded or reused; the method of increasing catalyst life comprising adjusting the alkali metal concentration of the aqueous stream to be purified to within the range of about 10 to about 300 ppm.

15. The method according to claim 14 wherein the alkali metal ion is added in the form of an alkali metal hydroxide or an alkali metal salt of weak acid.

16. The method according to claim 15 wherein the alkali metal is sodium.

17. The method according to claim 16 wherein the alkali metal concentration is adjusted to within the range of about 20 to about 70 parts per million parts of the polluted water.

18. The method according to claim 16 wherein the alkali metal concentration is in the range of about 30 to about 35 parts per million parts of the polluted water.

19. The method according to claim 18 wherein the pH of the polluted water prior to the addition of the alkali metal ion is less than about 4.

20. The method according to claim 19 wherein the TOD of the umpurified polluted water is about 2200 mg/liter or less.

21. The method according to claim 15 wherein the amount of alkali metal ion employed is continuously reduced as the TOD of the treated water approaches a chosen maximum.

22. In a process for the purification of an aqueous stream, containing dissolved and/or suspended oxidizable organic impurities and no more than about 1 part of alkali metal per million parts of the aqueous stream, to reduce the total oxygen demand of said aqueous stream by contacting said aqueous stream containing oxidizable organic impurities and an oxygen-containing gas with a catalyst consisting essentially of zinc aluminate promoted with 0.05 to 20 weight percent of (1) at least two different metals active for initiating oxidative reactions selected from the group consisting of the metals of the Groups IIIB, IVB, VB, VIB, VIIB, VIII, IB, and VA of the Periodic Table and (2) a rare earth metal under liquid phase oxidation conditions including a temperature in the range of 350° to 550° F. and a molar ratio of water to oxygen in the range of 10:1 to 200:1 to convert said organic impurities to innocuous materials so that said aqueous stream which has been substantially freed of said organic impurities can be safely discarded or reused; the method of increasing catalyst life comprising adding a sufficient amount of alkali metal ion to the aqueous stream prior to the catalytic oxidation thereof to increase the throughput that can occur before the pH breakthrough occurs.

* * * * *